United States Patent [19]
Ghosh

[11] Patent Number: 5,768,624
[45] Date of Patent: Jun. 16, 1998

[54] METHOD AND APPARATUS FOR EMPLOYING PING-PONG BUFFERING WITH ONE LEVEL DEEP BUFFERS FOR FAST DRAM ACCESS

[75] Inventor: Subir K. Ghosh, San Jose, Calif.

[73] Assignee: OPTI Inc., Milpitas, Calif.

[21] Appl. No.: 608,108

[22] Filed: Feb. 28, 1996

[51] Int. Cl.[6] ................................................. G06F 13/00
[52] U.S. Cl. ....................... 395/873; 395/484; 364/239.5
[58] Field of Search ................................. 395/250, 405, 395/484, 855, 872, 873, 877; 365/189.02, 189.05, 230.03, 230.04

[56] References Cited

U.S. PATENT DOCUMENTS

| | | | |
|---|---|---|---|
| 3,948,168 | 4/1976 | Kuehne | 101/93.05 |
| 4,333,143 | 6/1982 | Calder | 395/873 |
| 4,807,121 | 2/1989 | Halford | 395/873 |
| 4,956,768 | 9/1990 | Sidi et al. | 395/873 |
| 4,970,506 | 11/1990 | Sakaida et al. | 340/825.14 |
| 5,163,132 | 11/1992 | DuLac et al. | 395/873 |
| 5,224,213 | 6/1993 | Dieffenderfer et al. | 395/250 |
| 5,289,584 | 2/1994 | Thome et al. | 395/325 |
| 5,327,391 | 7/1994 | Hirata | 365/233 |
| 5,371,880 | 12/1994 | Bhattacharya | 395/551 |
| 5,499,341 | 3/1996 | Wilson et al. | 395/200.003 |
| 5,572,691 | 11/1996 | Koudmani | 395/405 |
| 5,633,653 | 5/1997 | Atherton | 345/98 |

*Primary Examiner*—Lance Leonard Barry
*Attorney, Agent, or Firm*—Fliesler, Dubb, Meyer & Lovejoy

[57] ABSTRACT

A memory access chip set includes a data buffer chip and a system controller chip. The data buffer chip contains storage elements that buffer data values transferred between a memory and either the host data bus or the peripheral bus. In one aspect, the storage elements are transparent latches, and not master/slave flip-flops. In another aspect, the storage elements are operated asynchronously. In another aspect, the storage elements are exactly two levels deep (additional accommodations are made in the case of data busses having mismatched widths). The arrangement of storage elements is such that only a single control pin is required on the data buffer chip to enable them, and only a single input pin (plus, in some cases, a clock input pin) for externally coordinating outputs from the storage elements for synchronous transfer over the destination bus. The system controller chip generates both the input control signal for the data buffer chip and CAS# for the memory, such that propagation delay variations in the system controller chip for the input control signal are substantially similar those in the system controller chip for CAS#.

20 Claims, 11 Drawing Sheets

METHOD AND APPARATUS FOR EMPLOYING PING-PONG BUFFERING WITH ONE LEVEL DEEP BUFFERS FOR FAST DRAM ACCESS

BACKGROUND OF THE INVENTION

1. Field of the Invention

The present invention pertains to the field of computer systems. More particularly, this invention relates to a chip set which couples host and peripheral buses to high speed dynamic random access memory.

2. Art Background

Prior computer systems typically include a central processing unit (CPU) and dynamic random access memory (DRAM). Such systems also usually include memory access circuitry that enables the CPU to access to the DRAM. Such memory access circuitry typically provides buffering and timing control functions for DRAM access.

Typically, the CPU is coupled to a host bus and transfers addresses and data to the memory access circuitry via the host bus. Such memory access circuitry usually includes a memory controller that generates the appropriate address strobe signals for reading and writing the DRAM in response to addresses generated by the CPU. Such memory access circuitry also usually includes one or more storage elements that buffer the data transferred between the CPU and DRAM.

Such memory access circuitry may also provide access to the DRAM from a peripheral bus as well as the host bus. Typically, such circuitry decodes addresses received from either the host bus or the peripheral bus and generates the appropriate row and column addresses and address strobe signals for accessing the DRAM memory cells. Such memory access circuitry also usually provides data buffering for read and write accesses of the memory by the CPU and the peripheral bus.

Some prior systems implement such memory access circuitry on a single integrated circuit (IC) chip. However, the high level of integration required to implement memory control and dual-ported buffering functions typically increases the gate count and integrated circuit pin count for such chips. Unfortunately, such high gate counts and pin counts usually impose high manufacturing costs for such chips.

Other prior systems implement such memory access circuitry within an integrated circuit chip set. In one prior system, for example, the memory controller circuitry is implemented in a system controller chip and the data buffering circuitry is implemented in one or more data buffer chips. Such distribution of functionality among several chips reduces the gate counts and pin counts for individual chips and typically results in reduced overall system cost.

For memory accesses originating on the CPU (host) bus, recent advances in memory design allow system designers to transfer data to or from the memory at a greater rate. However, higher speed data transfers impose greater demands on the memory access circuitry. For example, one recently evolved DRAM architecture is known as the extended data out (EDO) standard architecture. For an example of an EDO DRAM, refer to the Micron Technology, Inc. data sheet entitled MT4C4007J(S) 1 Meg×4 DRAM which is incorporated herein by reference. The EDO DRAM standard allows a memory controller to shorten the pulse width of the column address strobe (CAS#) signals to the DRAMs. Thus, for example, in a system operating at a host bus clock frequency of 66 MHz, a "fast page mode" DRAM might require CAS# to be asserted for a minimum of two clock cycles and negated for a minimum of one clock cycle, for a total access time of three clock cycles per data transfer in a pipelined burst. (Such memory access timing is described by the shorthand notation "X-3-3-3" for a 4-transfer sequence, where the "X" indicates an unspecified delay for the first transfer of the burst and each of the "3"'s indicate a 3-clock cycle delay for each of the second, third and fourth transfers of the burst.) An EDO DRAM, on the other hand, might allow CAS# to be asserted for only one clock cycle, for a total access time of only two clock cycles per data transfer in the pipelined burst (X-2-2-2).

The higher bandwidth transfers offered by EDO DRAM typically require increased buffering capacity in the buffer chips that buffer data transfers between the DRAM and host buses. Such an increased buffering requirement is a consequence of the inherent propagation delays across such buffer chips for a given process technology.

One solution for providing such increased buffering capacity is to implement first-in first-out (FIFO) memories in the buffer chips. Unfortunately, the implementation of FIFO memories typically increases the gate count and the manufacturing cost of such buffer chips.

In addition, such FIFO memories usually require management of FIFO input and output pointers. In systems that implement a memory controller chip separate from the buffering chips, such input and output pointer management is usually implemented on the system controller chip. As a consequence, buffering chips that contain FIFO memories must typically provide extra control pins that enable external control of the FIFO pointers. Unfortunately, such extra control pins usually increase the cost of such buffering chips and increase the overall cost of the computer system.

Another problem that arises for memory read accesses originating on the host bus, arises because memory is not a clocked device. That is, data is valid at the data port of the memory at a finite minimum time after CAS# is asserted at the CAS# input pin of the memory chip. In an X-3-3-3 system, this is usually not a problem because the data is usually valid at the data port of the memory well enough in advance of the next CAS# rising, such that the data can be clocked into the CPU or into an intervening register before the data output of the memory changes in response to the next CAS#. In such systems, a full master/slave register (as opposed to a transparent latch) is used to buffer the data so as to lock out the next data until the current data can be clocked into the CPU.

In an X-2-2-2 system, however, especially one operating at a clock frequency as high as 66 MHz, the data output of the buffering register usually does not reach the data inputs of the CPU well enough in advance of the clock rising edge in response to which the next CAS# is asserted, to satisfy the CPU's set-up and hold requirements. Even more significantly, at such a high clock frequency and such a few number of clock cycles per data access, the propagation delay from the time that the CAS# signal is asserted internally on the system controller chip, to the time that it reaches the memory, to the time that the data is valid at the output of the memory, can often be so lengthy that it is not yet valid at the data input ports of the buffering register by the time of the clock rising edge in response to which the next CAS# is asserted. Moreover, these propagation delays can vary significantly in different systems and at different times due to semiconductor fabrication process variations, temperature variations, and variations in the power supply voltage applied to the chips. It is known to clock a master/slave buffering register asynchronously, using a signal generated on the same chip that generates CAS# in order to match at least a portion of the propagation delay variations, but this technique has been used only for buffers which are master/slave registers and not latches, and has not been used for FIFO buffering schemes.

For DRAM accesses originating on the peripheral bus, the CAS#-to-data-valid propagation delays usually do not pose the same problem because the clock frequency on the peripheral bus is usually much less demanding than that on the host bus. Nevertheless, synchronization delays and other issues still make it very difficult to improve upon X-2-2-2 read and write access timing for peripheral bus accesses to the DRAM using only a single level of buffering. In addition, the problem is exacerbated for peripheral bus accesses to DRAM because the memory data bus is usually wider, often twice the width, of the peripheral data bus. Thus, other problems exist for peripheral bus accesses to memory, which render existing chipset architectures inadequate. Such problems are similar to but not the same as those which exist for host bus accesses to memory.

SUMMARY AND OBJECTS OF THE INVENTION

One object of the present invention is to provide improved data transfer rates between a CPU and a DRAM or between a peripheral bus (such as PCI) and a DRAM while avoiding the cost and complexities associated with implementing multi-level FIFO memories in buffering chips.

Another object of the present invention is to provide a memory access chip set that minimizes the number of control pins required for buffer coordination.

A further object of the present invention is to control buffering chips with signals generated on a different controller chip, the controller chip having relatively low power output drivers while meeting the timing requirements of a high speed host bus.

Roughly described, these and other objects are provided by a memory access chip set that includes a data buffer chip and a system controller chip. The data buffer chip contains storage elements that buffer data values transferred between a memory and either the host data bus or the peripheral bus. In one aspect, the storage elements are transparent latches, and not the larger and more complex master/slave flip-flops. In another aspect, the storage elements are operated asynchronously. In another aspect, the storage elements are exactly two levels deep (additional accommodations are made in the case of data busses having mismatched widths), thereby avoiding the complexity of deep FIFOs while accomplishing high-speed data transfers. The arrangement of storage elements is such that only a single control pin is required on the data buffer chip to enable them.

The system controller chip generates an input control signal for the data buffer chip and at least one address strobe signal for the memory in response to a set of address and control signals on the host bus. Propagation delay variations in the system controller chip for the input control signal are substantially similar to propagation delay variations in the system controller chip for the address strobe signal. As a consequence, variation in the relative propagation delays of the two signals is minimized in comparison to systems that generate input control signals and address strobe signals from separate integrated circuit chips.

In addition, the data buffer chip requires only a single input pin (plus, in some cases, a clock input pin) for externally coordinating outputs from the storage elements for synchronous transfer over the destination bus. Data values from the storage elements are guaranteed to be available on the destination bus at a time when a ready signal is sampled as asserted on the destination bus.

Other objects, features and advantages of the present invention will be apparent from the detailed description which follows.

BRIEF DESCRIPTION OF THE DRAWINGS

The present invention is described with respect to particular embodiments thereof and reference is accordingly made to the drawings in which.

DETAILED DESCRIPTION

Figure 1:
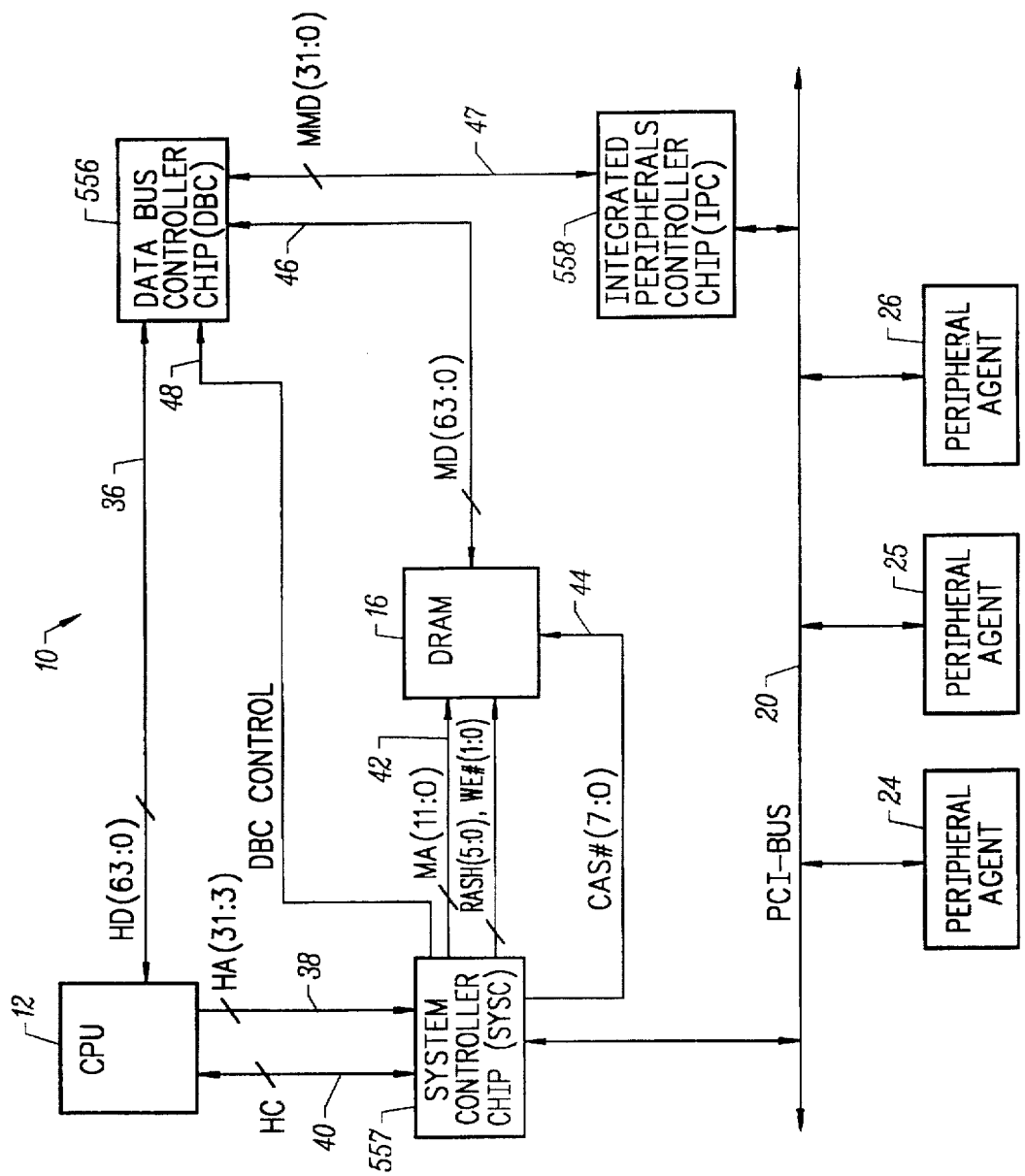
FIG. 1 is a block diagram of a computer system incorporating the invention.

FIG. 1 illustrates a computer system 10 for one embodiment. The computer system 10 includes a central processing unit (CPU) 12, a dynamic random access memory (DRAM) 16, and a memory access (core logic) chip set comprising a system controller (SYSC) chip 557, a data bus controller (DBC) chip 556, and an integrated peripheral bus controller (IPC) chip 558.

For one embodiment, the CPU 12 is a Pentium (®Intel) processor available from Intel Corporation, Santa Clara, Calif. and is described in Intel, "Pentium Processor User's Manual," Vol. 1, and "Pentium Processor Data Book" (1993), incorporated herein by reference. As used herein, the term "Intel 80×86 compatible CPU" refers to any CPU which is software compatible with the Intel 8086, 80286, 80386, 80486, Pentium, Pentium Pro (all of which can run software written for the 8086), or any future revision of any of such devices.

The CPU is connected to a host bus comprising a host address HA(31:3) bus 38, a host data HD(63:0) bus 36, and a host control HC bus 40. The host control bus 40 and host address bus 38 are connected to the system controller 557 and the host data bus 36 is connected to the data bus controller 556. The system controller 557 communicates addresses to the DRAM 16 via a memory address MA(11:0)

bus 42, and the DRAM 16 communicates data with the data bus controller 556 via a memory data MD(63:0) bus 46. The system controller 557 also communicates row address strobe signals RAS#(5:0) and write enable signals WE#(1:0) to the DRAM 16.

The system 10 further includes a peripherals bus 20 which may, for example, be a PCI-bus. A number of peripheral agents are connected to the PCI-bus 20, shown symbolically in FIG. 1 as peripheral agents 24, 25 and 26. Both the system controller 557 and the integrated peripherals controller 558 communicate with the PCI bus 20, and an MMD(31:0) bus 47 communicates bi-directionally between the DBC 556 and the IPC 558. In addition to the above, the system controller chip 557 provides eight column address strobe (CAS#(7:0)) signals 44 to the DRAM 16, and also provides a number of DBC control signals 48 to the data bus controller chip 556.

For one embodiment, the host bus conforms to the bus protocol of the Pentium Processor and the peripheral bus 20 conforms to a published industry bus standard for a Peripheral Component Interconnect bus. The Peripheral Component Interconnect bus specification is set forth in PCI Special Interest Group, "PCI Local Bus Specification," Rev. 2.1 (Jun. 1, 1995), incorporated herein by reference. As used herein, the term "PCI bus" refers to any bus that conforms to that specification or any subsequent revision thereof.

During data transfer cycles that originate on the host bus, the system controller 557 receives addresses over the host address bus 38. The system controller 557 decodes the addresses, and provides the appropriate addressing signals on the memory address bus 42 and control signals including the column address strobe (CAS#(7:0)) signals 44 to access the DRAM 16. During data transfer cycles that originate from one of the peripheral agents 24–26 via the peripheral bus 20, the system controller chip 557 receives addresses over the peripheral bus 20, decodes the addresses, and generates the appropriate addresses on the memory address bus 42 and control signals CAS#(7:0) 44 to access the DRAM 16.

Data transfer sequences over the host bus are controlled with a set of control signals transferred over the host control bus 40. These control signals are synchronous with a host clock signal (HCLK) generated by a clock generator circuit (not shown). The host control bus 40 includes a host address strobe signal (HADS#) generated by the CPU 12 and a host bus burst ready signal (HBRDY#) generated by the system controller chip 557. The HADS# signal is asserted by the CPU 12 to indicate the start of a new bus cycle on the host bus. (Note that HCLK, HADS# and HBRDY# are referred to as CLK, ADS# and BRDY#, respectively, in the Intel 80×86 literature.) The system controller chip 557 asserts the HBRDY# signal to indicate that valid data is available on the host data bus 36 in response to a read transaction initiated by the CPU 12. The CPU 12 clocks in read data from the host data bus 36 on the rising edge of HCLK at which the CPU samples HBRDY# asserted. In addition, the system controller chip 557 asserts the HBRDY# signal to indicate the acceptance of data from the host data bus 36 during a write transaction initiated by the CPU 12.

Note that while the system shown in FIG. 1 has only one host device (CPU 12) connected to the host bus, in another embodiment another, or several, host devices can be connected to the host bus. Such other host devices are all considered equivalent to the CPU 12 for purposes of the present invention.

The DBC chip 556 contains internal buffer circuitry that routes data transfers between the host data bus 36 and the memory data bus 46. The buffering circuitry in the DBC 556 is externally controlled by the system controller chip 32 via the DBC control signals 48. The DBC control signals 48 include a HDOE# data output enable signal. For a data read operation, the HDOE# signal informs the DBC chip 556 when read data should be driven onto the host data bus 36.

The DBC control signals 48 also include two device latch enable signals DLE#(1:0). DLE0# controls the loading of buffers in the DBC 556, and DLE1#, together with the host bus clock signal HCLK, coordinates data outputs from the buffers in DBC 556 onto the host data bus 36.

I. HOST BUS READ ACCESSES TO DRAM

Figure 2:
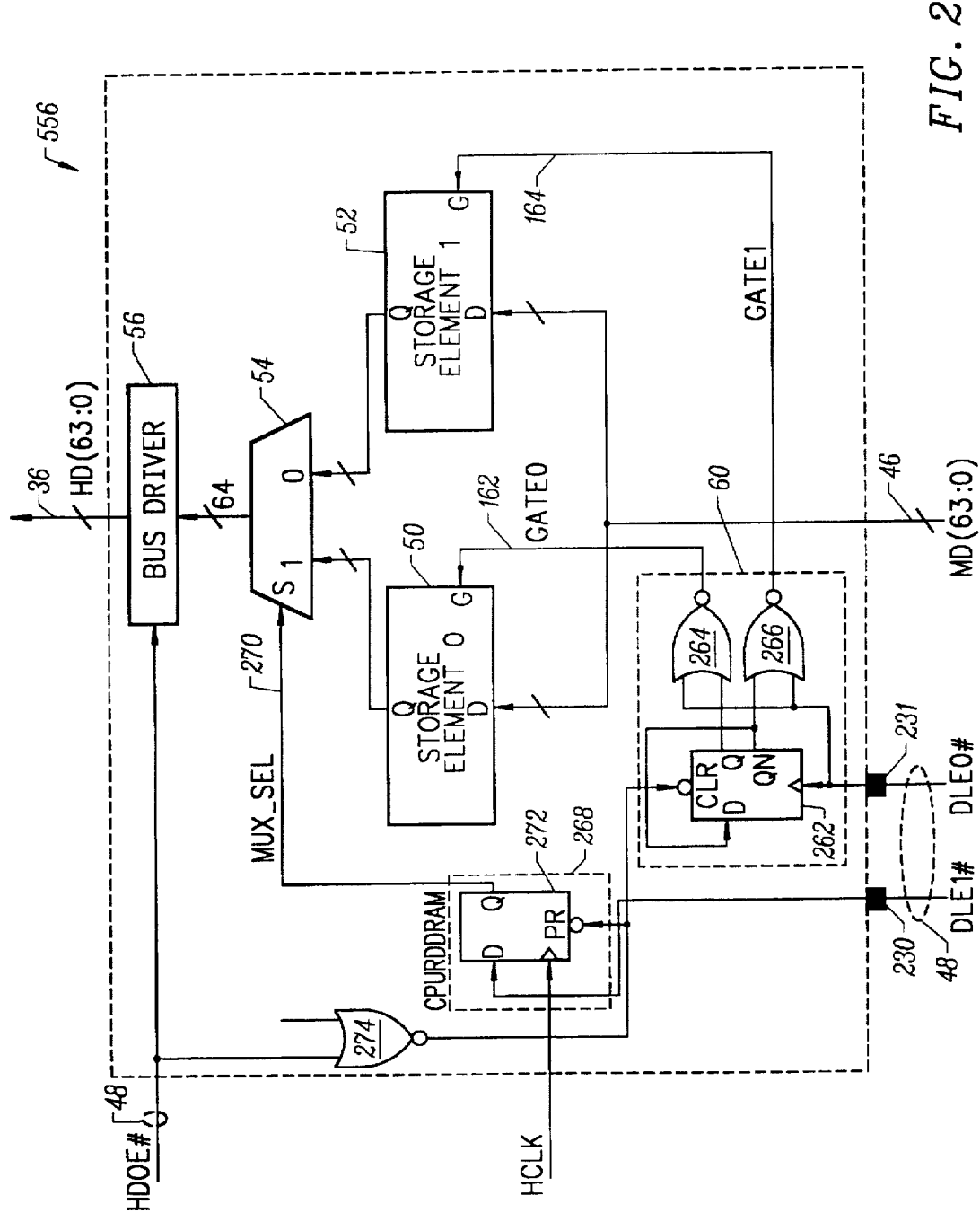
FIG. 2 is a block diagram of buffering circuitry within the DBC chip of FIG. 1 that buffers data transfers between the DRAM and host data bus during read transactions by the CPU of FIG. 1.

FIG. 2 illustrates buffering circuitry contained within the DBC chip 556 that buffers data transfers between the DRAM 16 and the host data bus 36 during read transactions by the CPU 12. The buffering circuitry includes a pair of storage elements 50 and 52 and a multiplexer circuit 54. The storage elements 50 and 52 are each coupled to receive 64-bit data values from the DRAM 16 via the memory data bus 46, and the data output port of multiplexer 54 is coupled, via a bus driver 56, to the host data bus 36. Although the multiplexer 54 is shown as a separate functional block in FIG. 2, it will be understood that any such multiplexer can be implemented instead through complementary control of commonly connected 3-state output stages of the immediately upstream data path components, in this case storage elements 50 and 52.

The storage elements 50 and 52 each comprise a 64-bit data latch and both the memory data bus 46 and the host data bus 36 carry 64-bit data values. In other embodiments, the data latches 50 and 52 can be replaced with master/slave registers or other types of storage elements. As used herein, the term "storage element" includes both master/slave registers and transparent latches.

The circuit of FIG. 2 further includes a logic circuit 60, which takes DLE0# as an input via DBC pin 231, and generates two gate control signals 162 and 164. GATE0 control signal 162 is connected to the enable input of storage element 50, whereas GATE1 signal 164 is connected to the enable input of storage element 52. Inside logic circuit 60, DLE0# is connected to the clock input of a D flip-flop 262, the QN output of which is connected back to the D input such that the flip-flop 262 performs a toggle function in response to each rising edge of DLE0#. The Q output of the flip-flop 262 is connected to one input of a NOR gate 264, and the QN output of the flip-flop 262 is connected to one input of a NOR gate 266. The other input of both of the NOR gates 264 and 266 are connected to receive DLE0#. The output of NOR gate 264 is the GATE0 signal 162, and the output of NOR gate 266 is the GATE1 signal 164. As will be seen below, the logic circuit 60 causes the data from the memory data bus 46 to be loaded into the storage elements 50 and 52 alternately, in response to alternating high-going pulses on DLE0#, all asynchronously.

The DLE1# signal is provided via the DBC 556 external connection pin 230 to a synchronization circuit 268, the output of which (MUX_SEL signal 270) is provided to the select input of multiplexer 54. Inside the synchronization circuit 268, DLE1# is connected to the D input of a flip-flop 272, the Q output of which is MUX_SEL signal 270. The clock input of flip-flop 272 receives the host bus clock signal HCLK.

Thus the DLE1# signal determines whether multiplexer 54 selects the data output port of storage element 50 or storage element 52 onto the host data bus 36, but unlike the loading of data into the storage elements 50 and 52, the selection made by multiplexer 54 is synchronized with the host bus clock signal HCLK. Thus, despite the asynchronous nature with which data is loaded into the storage elements, the circuit of FIG. 2 ensures that data is made available on the host data bus 36 in time to meet the set-up time requirements of the destination device, in this case CPU 12. As used herein, a signal is "synchronous" with a clock signal if it is guaranteed to be available to downstream clocked circuitry in time to meet the set-up time requirements of such downstream clocked circuitry.

It should be noted that to synchronize DLE1# with HCLK in the DBC chip 556 for generating MUX_SEL signal 270, the system controller 557 needs to generate its edge transitions in DLE1# one HCLK cycle earlier than would otherwise be necessary if DLE1# drove MUX_SEL signal 270 directly within DBC 556. However, HCLK operates at a very high frequency typically on the order of 66 MHz. The signal path delays from the state machine in system controller 557 which generates its internal DLE1B signal, through the output drivers of system controller 557, and along the printed circuit board traces to the data buffer controller 556, are lengthy enough that such a direct drive signal might not reach the multiplexer 54 early enough to ensure that data can be provided to the data inputs of the CPU 12 sufficiently in advance of the next HCLK rising edge to satisfy the CPU's setup and hold requirements. An alternative embodiment would be to drive MUX_SEL signal 270 directly from DLE1#, but provide a very fast and powerful output driver in the system controller 557 to drive DLE1#. However, such an output driver would increase the manufacturing cost of system controller 557 and cause increased signal noise on the printed circuit board. Resynchronization of DLE1# within the data buffer controller 556, in conjunction with early generation of DLE1# edge transitions, allows the use of a weaker and less disruptive DLE1# output driver on the system controller chip 557.

The bus driver 56 is enabled by the HDOE# signal of the DBC control signals 48. HDOE# is also connected to one input of a NOR gate 274, the other input of which is unimportant for an understanding of the present invention and can be assumed to be low at all times relative herein. The output of NOR gate 274, designated CPURDDRAM, indicates when asserted that a host bus access to the DRAM is under way. This signal is provided to an inverting preset input of flip-flop 272, and also to an inverting clear input of flip-flop 262. In this manner, the circuitry of FIG. 2 ensures that the first data written into one of the registers 50 and 52 is indeed the first data to be delivered to the CPU 12 via the host data bus 36.

Figure 3:
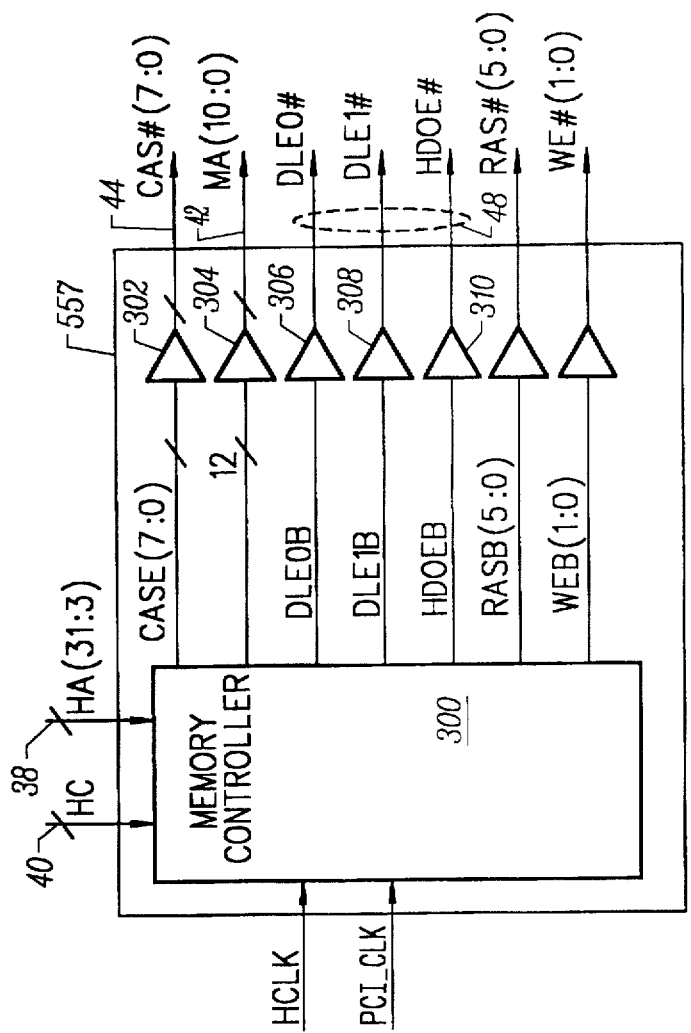
FIG. 3 is a block diagram illustrating components of the system controller chip of FIG. 1.

FIG. 3 illustrates pertinent aspects of the system controller chip 557. Included in this chip is a memory controller 300 which includes state machines operating synchronously with HCLK and PCI_CLK. The details of the memory controller 300 itself are not important for an understanding of the present invention. In addition to the clock signals, the memory controller 300 receives certain signals from the host bus control lines 40, and the host address bus 38, among other signals, and generates, among other signals, the following signals internally on the chip 557: CASB(7:0), DLE0B, DLE1B, HDOEB, RASB(5:0), WEB(1:0) and memory address signals.

Note that some of the signals described in this specification are asserted high, whereas others are asserted low. As used herein, signals which are asserted low are given a '#' or 'B' suffix in their names, whereas those asserted high lack a '#' or 'B' suffix. Signals for which an assertion polarity has no meaning may or may not include a '#' or 'B' suffix. Also, two signal names mentioned herein that are identical except that one includes the '#' suffix while the other includes the 'B' suffix, are intended to represent off-chip and on-chip versions of the same signal, respectively. Therefore, the signals CASB(7:0), DLE0B, DLE1B and HDOEB, represent internal versions of the CAS#(7:0), DLE#, DLE1# and HDOE# signals, respectively, appearing on printed circuit board traces outside the chip 557.

Since CASB(7:0), DLE0B, DLE1B and HDOEB are all on-chip signals, they are all delayed by no more than two to three nanoseconds beyond the HCLK rising edge in response to which they were generated. The corresponding signals off-chip, however, must first pass through buffer-drivers 302, 306, 308 and 310, respectively. The propagation delay (insertion delay) through drivers 306 and 308 (for DLE#(1:0)) can range anywhere from 4-12 nanoseconds depending on process variations during fabrication, the temperature of the chip during operation, and the power supply voltage applied to the chip 557 during operation. The propagation delay for CAS#(7:0) through buffer/driver 302 is slightly longer, ranging anywhere from 5-15 nanoseconds, because a larger driver is needed to accommodate greater current output requirements. It is a feature of the invention that CASB(7:0) and DLE0B are generated on the same chip; this ensures that the propagation delay through the buffer 302 will be approximately equal to the propagation delay through the buffer 306 regardless of process, temperature and voltage conditions. That is, when buffer 302 is operating in its best case (shortest propagation delay), buffer 306 is also operating in its best case and when buffer 302 is operating in its worst case (longest propagation delay), buffer 306 is also operating at its worst case. More specifically, $$T_{CAS} - T_{DLE0} = \text{constant}$$

where $T_{CAS}$ is the delay with which an edge transition appears on the CAS# leads externally to the chip 557 relative to the HCLK rising edge in response to which the edge transition was generated, and $T_{DLE0}$ is the time delay with which an edge transition appears on the DLE0# leads external to the chip 557 relative to the HCLK rising edge in response to which the edge transition was generated. The constant should be less than about 5 nS.

The buffers which drive CAS# and DLE0# are selected from a macrocell library which includes several possible drivers, each having its delay time specified as a fixed delay time plus a load-dependent delay time. In one embodiment, the propagation delay through the two drivers are matched by selecting the same macrocell for both drivers. In a second embodiment, it is noted that whereas DLE0# drives only a single input pin (on DBC 556), having a capacitive load of only 5–10 pF, CAS# must drive a load which ranges from 15 pF–85 pF or so, depending on installed memory. It is also noted that printed circuit board routing delays are typically longer for CAS# than for DLE0#. Therefore, in this second embodiment, the propagation delays through the two drivers are matched by selecting a driver for CAS# which has a slightly shorter fixed delay than the driver selected for DLE0#. The transistor- and layout-level structures of each of the drivers themselves are conventional.

Figure 4:
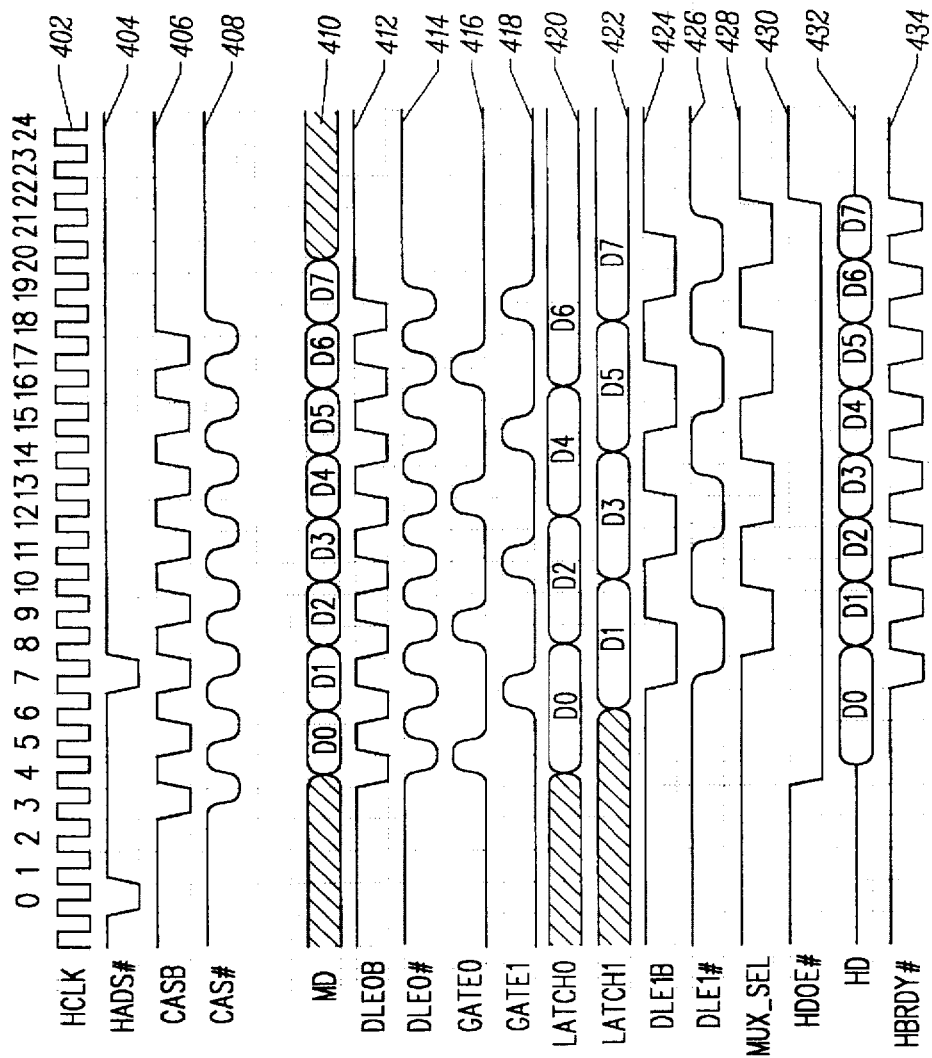
FIG. 4 is a timing diagram illustrating the timing of a read burst transaction targeted for the DRAM by the CPU (FIG. 1).

FIG. 4 illustrates the timing of a burst read transaction targeted for the DRAM 16 by the CPU 12. Waveform 402 illustrates the HCLK signal. For the purposes of this description, it will be assumed that the effective edge of HCLK is always the rising edge, and a clock cycle is considered to refer to the time period between consecutive HCLK rising edges. These clock cycles are numbered 0 . . . 24 in FIG. 4 for purposes of this discussion. The transactions illustrated in FIG. 4 are DRAM page hit cache miss tranactions, and assume an HCLK clock period of 15 nanoseconds, with a burst timing of 8-2-2-2-2-2-2-2. Note that the timing of certain signals in FIG. 4 is only illustrative, as will become more clear with respect to FIGS. 5, 6 and 7.

Waveform 404 illustrates HADS# driven by the CPU 12. HADS# is asserted in HCLK cycle 0 and in response thereto, as illustrated in waveform 406, the memory controller 300 (FIG. 3) asserts CASB in clock cycle 3. The memory controller 300 alternately negates and asserts CASB on consecutive HCLK cycles until CASB has been asserted eight times.

Waveform 408 illustrates CAS# as it appears to the DRAM 16, and it can be seen that in addition to being less crisp than CASB, it is also delayed by several nanoseconds. Although not shown in FIG. 4, it is assumed that addresses generated by system controller chip 557 arrive at the DRAM 16 via MA(11:0) sufficiently in advance of each CAS# assertion in order to satisfy the DRAM's set-up time requirements.

The DRAM 16 is an unclocked device, and output data is valid at its data port beginning some period of time after CAS# is asserted. For 60 nanosecond EDO DRAM, this delay is approximately 18 nanoseconds. Thus it can be seen from waveform 410 that eight quadwords of data, numbered D0, . . . , D7 become valid on MD(63:0) some time in HCLK cycles 4, 6, 8, 10, 12, 14, 16 and 18.

Inside the system controller 557, memory controller 300 delays assertion of DLE0B for one HCLK cycle after each assertion of CASB. This inserts a fixed delay of 15 nanoseconds. As with the CASB, the memory controller 300 asserts DLE0B every second cycle of HCLK until DLE0B has been asserted eight times (waveform 412). Waveform 414 illustrates DLE0# as it appears when it reaches the data bus controller chip 556, and it can be seen that it is delayed by several nanoseconds relative to the HCLK cycle rising edge in response to which it was generated.

Waveform 416 illustrates the GATE0 signal applied to the enable input of storage element 50 (FIG. 2), generated in response to DLE0#. GATE0 goes high for one HCLK cycle in response to each of the first, third, fifth and seventh low-going pulses in DLE0#. Because GATE0 is generated on-chip in response to DLE0#, GATE0 is delayed by only 2–3 nanoseconds relative to DLE0#. The GATE1 signal 418 is generated similarly, 2–3 nanoseconds later than each of the second, fourth, sixth and eighth low-going pulses in DLE0# (waveform 418).

Waveform 420 illustrates the validity of data at the output of storage element 50. It can be seen that the first data quadword D0 is enabled into the latch in response to the first high-going pulse in GATE0, and becomes latched therein when GATE0 returns low sometime during HCLK cycle 5. Similarly, D2 is enabled into the latch sometime in HCLK 8, and latched therein in HCLK cycle 9. D4 is enabled into the latch sometime in HCLK 12, and latched therein in HCLK cycle 13, and D6 is enabled into the latch sometime in HCLK 16, and latched therein in HCLK cycle 17.

Likewise, waveform 422 illustrates the validity of data at the output of storage element 52. It can be seen that the second data quadword D1 is enabled into latch 52 in response to the first high-going pulse in GATE1, and becomes latched therein when GATE1 returns low sometime during HCLK cycle 7. Similarly, D3 is enabled into latch 52 sometime in HCLK 10, and latched therein in HCLK cycle 11. D5 is enabled into latch 52 sometime in HCLK 14, and latched therein in HCLK cycle 15, and D7 is enabled into latch 52 sometime in HCLK 18, and latched therein in HCLK cycle 19.

DLE1B is illustrated in waveform 424. As can be seen, it begins high, and alternates polarity every second HCLK cycle. Waveform 426 illustrates DLE1# as it appears to the data bus controller chip 556, and waveform 428 illustrates this signal as MUX_SEL, after it has been resynchronized with HCLK. The synchronization requires one HCLK cycle, so memory controller 300 generates each edge transition in DLE1B one full HCLK cycle earlier than the selection made by multiplexer 54 (FIG. 2) is to change.

Waveform 430 illustrates the HDOE# signal, and waveform 432 illustrates which data quadwords are valid on the HD bus 36 and when. Quadword D0 is valid until the end of HCLK cycle 7, and each succeeding quadword is valid until the end of each respective second HCLK cycle thereafter. Waveform 434 illustrates HBRDY# generated by the system controller 557 to the CPU 12, and it can be seen that the CPU 12 will sample HBRDY# asserted (and clock in each data quadword) just before the data bus controller 556 bus driver 56 transitions to outputting the next data quadword.

Thus, FIG. 4 illustrates how an 8-2-2-2 . . . host memory read access can be successfully implemented with EDO DRAM. The same architecture can also be used to achieve 7-2-2-2 . . . , or even 6-2-2-2, memory read access timing. It is a feature of the invention that only two storage elements 50 and 52 are needed for buffering the data. These storage elements are operated in "ping-pong" fashion, essentially making them a two-deep, first-in, first-out (FIFO) buffer. Significantly, a FIFO buffer of greater depth is not required. It is another feature of the invention that the storage elements 50 and 52 can be transparent latches rather than master/slave flip-flops. Even a system in which the storage elements 50 and 52 were master/slave flip-flops can benefit from the invention.

It is another aspect of the invention that 8-2-2-2 . . . host read access timing is achieved by considering the data read path from CASB, through the DRAM 16 and storage elements 50 and 52, to be asynchronous, and resynchronizing the data with HCLK through multiplexer 54 and onto the host data bus 36. This aspect is made possible in the present embodiment in part because CAS# and DLE0# are generated on the same chip 557.

Figure 5:
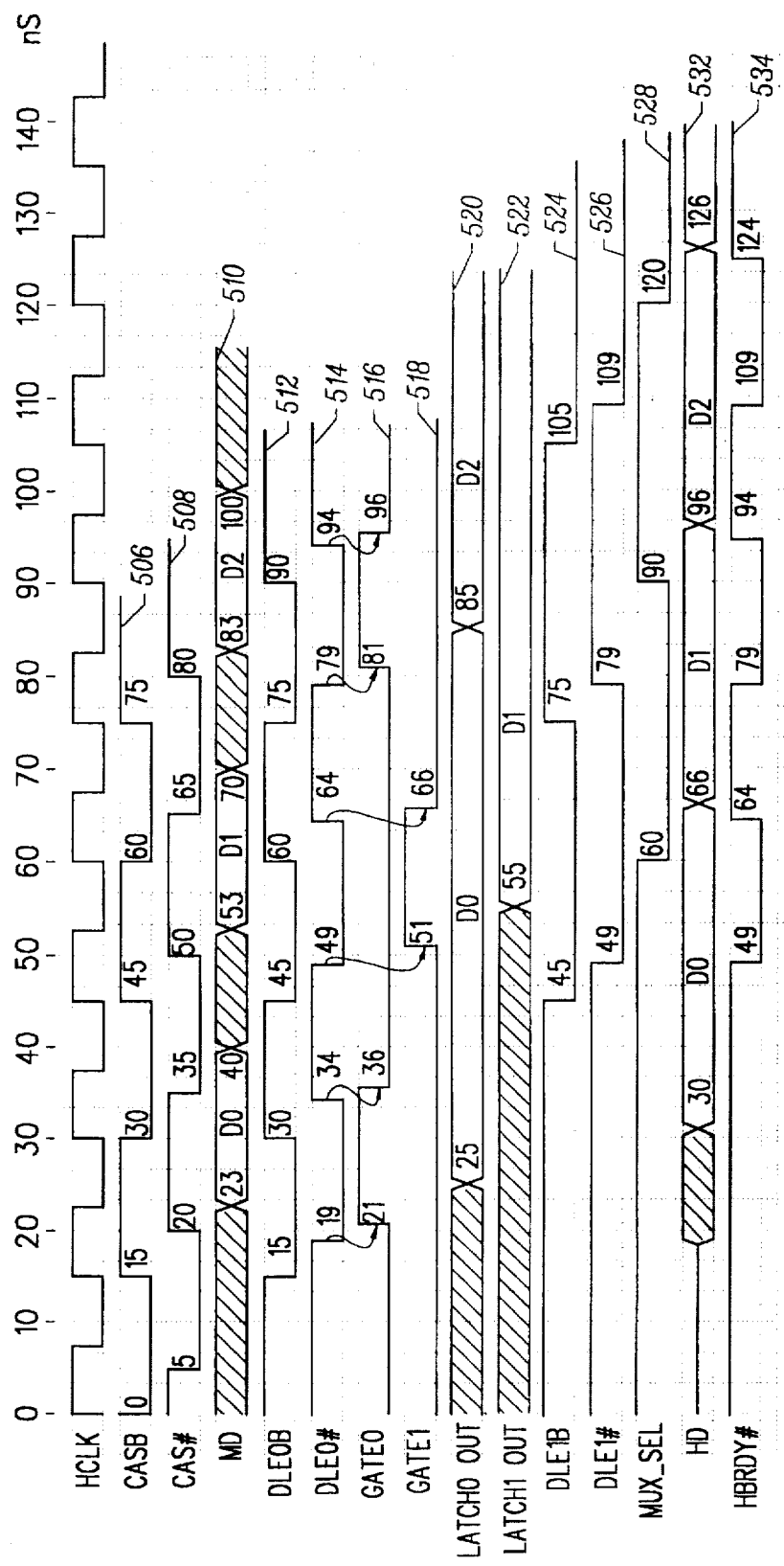
FIG. 5 is an enlargement of a portion of the waveforms of FIG. 4, assuming best case delays.
Figure 6:
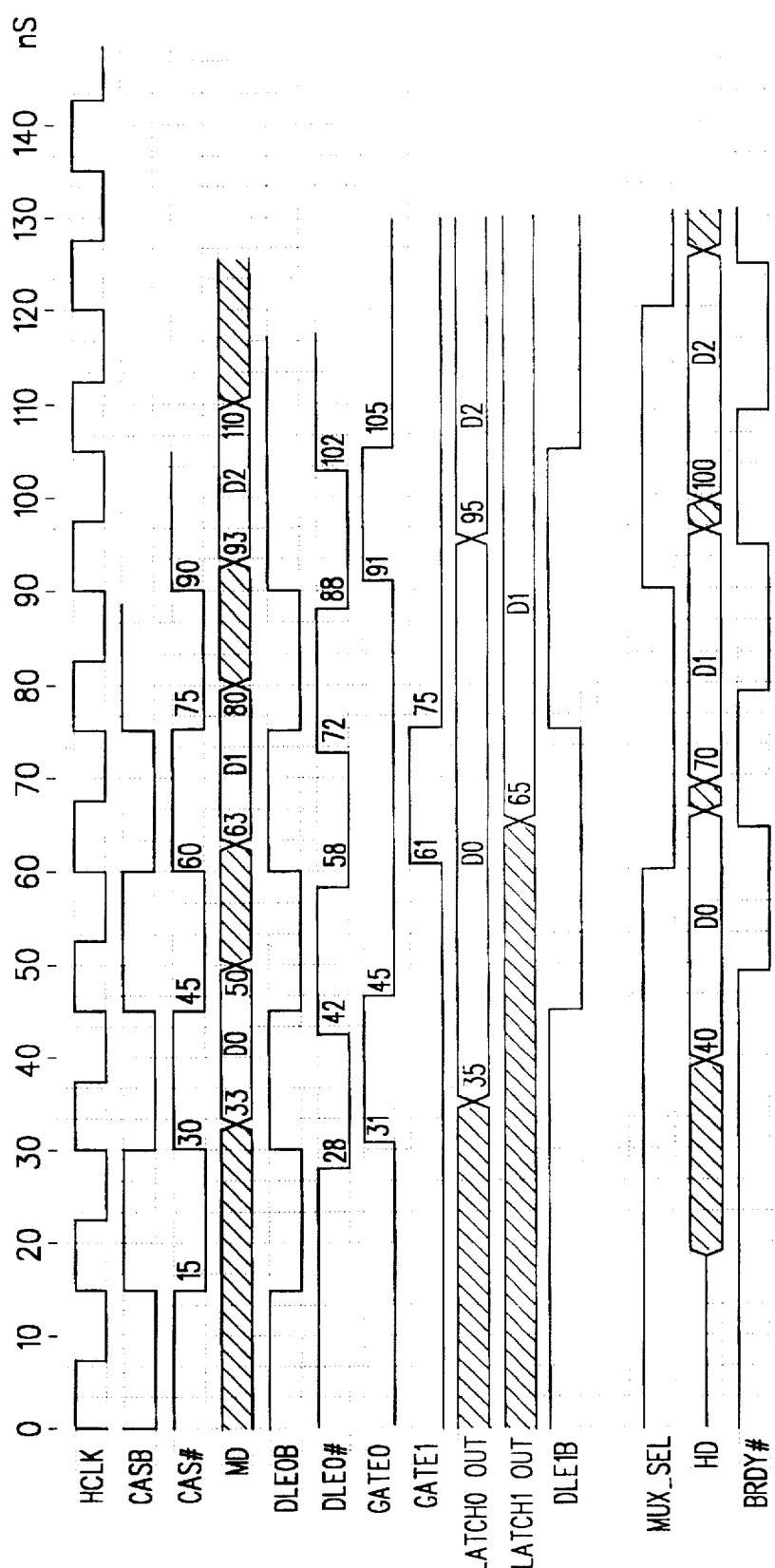
FIG. 6 is an enlargement of some of the waveforms of FIG. 4, assuming worst case delays.
Figure 7:
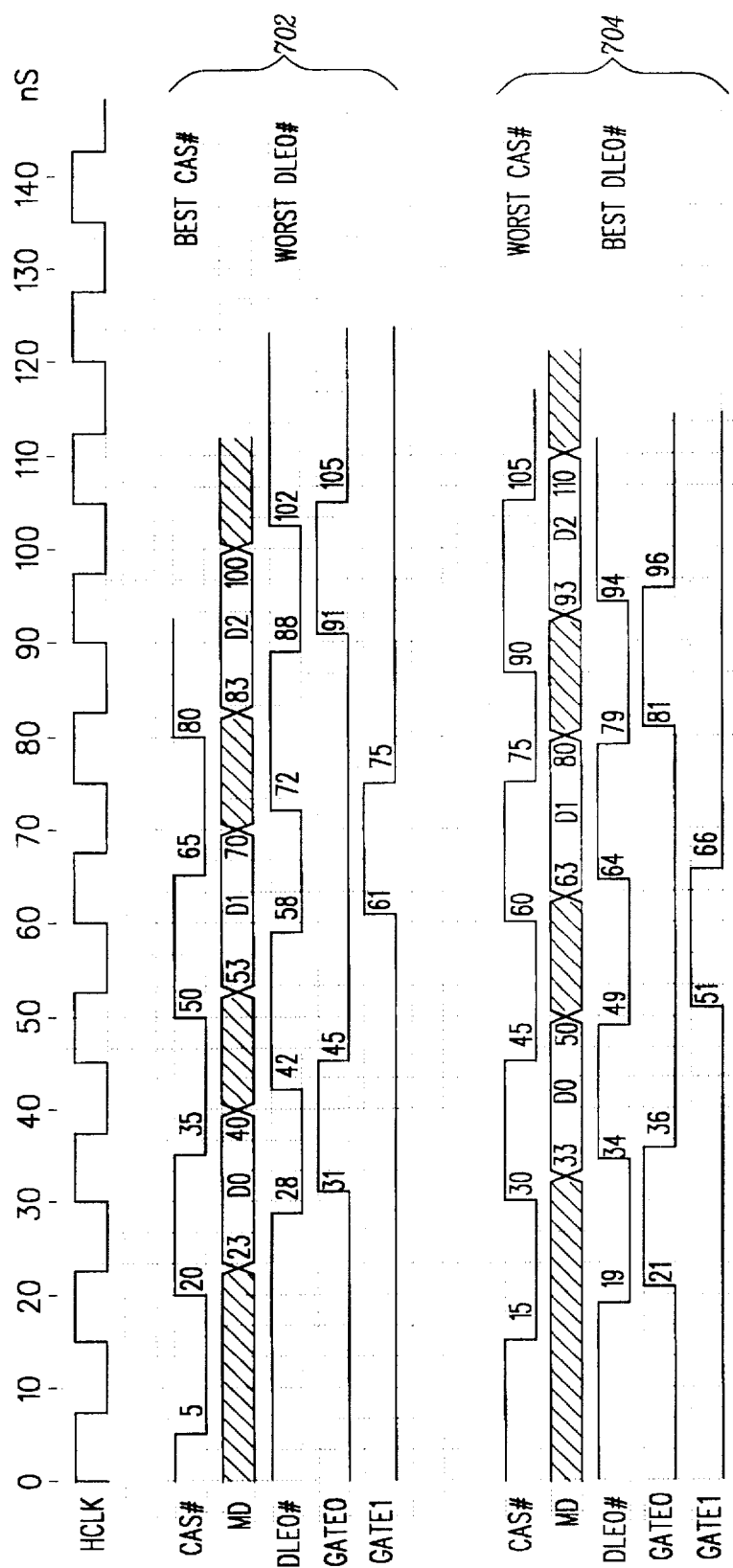
FIG. 7 is a timing diagram illustrating a portion of the diagram of FIG. 4 assuming unmatched delays.

FIGS. 5, 6 and 7 illustrate the advantages of this aspect. FIG. 5 is an enlargement of a portion of the waveforms of FIG. 4, assuming the best case situation in which $T_{CAS}$ is shortest. Because DLE0# is generated on the same chip as CAS#, $T_{DLE0}$ also will likely exhibit its best case delay. In such best case situation, $T_{CAS}$=5 ns and $T_{DLE0}$=4 ns. Time is indicated in nanoseconds across the top of FIG. 5, with the HCLK rising edge in response to which CASB is first asserted, being given time 0.

As illustrated in waveform 508, CAS# is asserted to the DRAM 16 only 5 nanoseconds after the HCLK rising edge in response to which CASB was first asserted. CAS# is again asserted to the DRAM 16 at 35 nanoseconds and 65 nanoseconds. Data becomes valid on MD bus 46 approximately 18 nanoseconds after the DRAM 16 receives each CAS# falling edge, and keeps it valid until about 5 nanoseconds after it receives the next assertion of CAS# (waveform 510). Thus, if data is not to be lost, for the best case situation, the appropriate storage element 50 or 52 needs to latch in the data from the MD bus 46 sometime between 23 and 40 nanoseconds after the HCLK rising edge in response to which each CAS# is generated.

The DLE0# signal from the system controller 557, which controls the latching operation in data bus controller 556, need not traverse the DRAM 16 with its inherent propagation delays. The memory controller 300 therefore takes up part of the necessary delay by delaying DLE0B for one HCLK cycle after each CASB is asserted (waveform 512). Allowing for a best case delay of 4 nanoseconds introduced by system controller output driver 306, DLE0# alternates polarity at the input of data bus controller 556 every 15 nanoseconds beginning at about 19 nanoseconds after the HCLK rising edge in response to which the first CAS# was generated (waveform 514). Allowing for a 2 nanosecond typical delay through NOR gate 264, this results in logic circuit 60 enabling the latch 50 during the period of time from about 21 nanoseconds to about 36 nanoseconds after the initial HCLK rising edge. Thus, latch 50 will latch in data from MD bus 46 at about 36 nanoseconds, which is comfortably within the time period within which D0 is valid on MD bus 46. Similarly, as indicated in waveform 518, GATE1 enables latch 52 between about 51 nanoseconds and 66 nanoseconds, the latter time being comfortably within the time period during which D1 is valid on MD bus 46. As again indicated in waveform 516, GATE0 again enables storage element 50 from about 81 nanoseconds to about 96 nanoseconds, the latter time being comfortably within the time period during which D2 is valid on MD bus 46.

FIG. 6 illustrates the same portion of the FIG. 4 transaction as FIG. 5 does, but FIG. 6 assumes a worst case delay in CAS# output buffer 302 of 15 nanoseconds. Similarly, the worst case delay of 12 nanoseconds is assumed in DLE0# output driver 306. Without explaining the timing of each waveform in FIG. 6 as is set forth above with respect to FIG. 5, it can be seen that if such worst case delays are assumed, D0 is valid on MD bus 46 from about 33 nanoseconds to about 50 nanoseconds, D1 is valid on MD bus 46 from about 63 nanoseconds to about 80 nanoseconds, and D2 is valid on MD bus 46 from about 93 nanoseconds to about 110 nanoseconds. It can also be seen that this data is latched into the appropriate storage elements 50 and 52 at about 45 nanoseconds, 75 nanoseconds and 105 nanoseconds, respectively, all comfortably within the time periods within which the respective data quadwords are valid on MD bus 46. FIGS. 5 and 6, therefore, illustrate that because CAS# and DLE0# are generated on the same chip with matched delays, the ping-pong latch arrangement of FIG. 2 will correctly store and forward data from DRAM 16 with X-2-2-2 . . . timing.

FIG. 7 illustrates two extreme examples of what might occur if CAS# and DLE0# were not generated on the same chip. Specifically, waveform grouping 702 illustrates the timing which could take place if the chip on which CAS# is generated is operating in optimum conditions (shortest delay of 5 nanoseconds) while the chip on which DLE0# is generated is operating under its worst conditions (longest delay of 12 nanoseconds). Waveform grouping 704 illustrates the opposite case, in which CAS# has its worst case delay of 15 nanoseconds and DLE0# has its best case delay of 4 nanoseconds. Again without explaining all of the timing as set forth above with respect to FIG. 5, it can be seen that in grouping 702, GATE0 and GATE1 cause the latches 50 and 52 to latch in data at times when the data on MD bus 46 is in transition. Similarly, in waveform grouping 704, GATE0 and GATE1 can cause the storage elements 50 and 52 to latch at a time just after the data has become valid on MD bus 46, potentially too soon to meet set-up time requirements of storage elements 50 and 52. While the two examples in FIG. 7 are extreme, it will be appreciated that a system design in which CAS# and DLE0# were generated on different chips would need to accommodate both of these extremes in order to guarantee accuracy, and therefore would not be able to implement X-2-2-2 timing without taking other extraordinary design steps.

Returning to FIG. 5, the time periods during which data is valid on the outputs of latches 50 and 52 are illustrated in waveforms 520 and 522, respectively. The asynchronous nature of the circuitry which loads these latches permits faster operation, but risks metastability when the data is to be clocked into the CPU synchronously with HCLK. Thus the multiplexer 54, in combination with synchronization circuitry 268 and in response to DLE1#, resynchronizes the data provided to HD bus 36 with HCLK by selecting between the outputs of storage elements 50 and 52 synchronously with HCLK. The multiplexer selection signal, illustrated in waveform 528, alternates polarity at 60, 90 and 120 nanoseconds, in response to DLE1# alternating polarity at about 49, 79 and 109 nanoseconds as illustrated in waveform 526. As illustrated in waveform 524, the memory controller 300 transitioned DLE1B at 45, 75 and 105 nanoseconds (one HCLK cycle early) in order to cause MUX_SEL to switch at 60, 90 and 120 nanoseconds.

The data output selected by multiplexer 54 onto HD bus 36 is illustrated in waveform 532. It can be seen that data quadword D0 is valid until about 66 nanoseconds, after which data quadword D1 is valid until about 96 nanoseconds, after which data quadword D2 is valid until about 126 nanoseconds. HBRDY# is illustrated in waveform 534, and as can be seen, the CPU 12 will sample it low on the HCLK rising edges which occur at about 60, 90 and 120 nanoseconds, each comfortably within the time period during which D0, D1 and D2, respectively, are valid on HD bus 36. The similar result appears in FIG. 6, where the worst case delays are assumed for both CAS# and DLE0#.

II. PCI-BUS READ ACCESS TO DRAM

Figure 8:
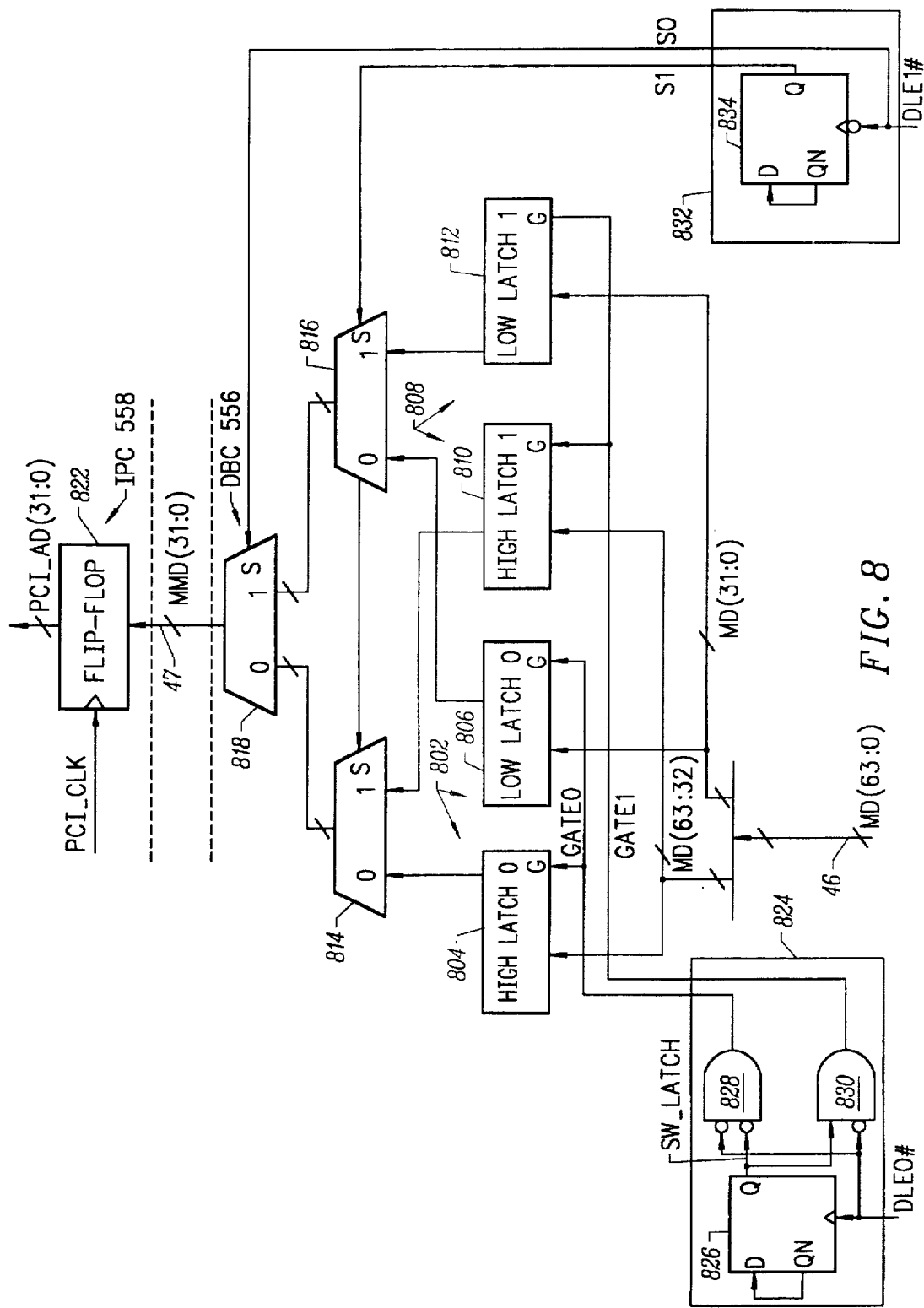
FIG. 8 is a block diagram of a portion of the DBC chip of FIG. 1 for another embodiment of the invention.

FIG. 8 illustrates another embodiment of the invention also used in the system 10 (FIG. 1). In this embodiment, X-1-1-1 timing (measured at the rate of the PCICLK) is achieved for PCI-bus-originated read accesses to DRAM, using ping-pong latch buffering only. A complication exists for data transfers between the MD bus 46 and the PCI_AD bus, because the PCI_AD bus is only 32 bits wide, whereas MD bus 46 is 64 bits wide. This complication is handled in the system 10 by using four 32-bit "half-latches" or "sub-latches" instead of two 64-bit latches in the ping-pong buffering scheme. The high and low half-latches of storage element 0 are loaded simultaneously from MD(63:0), but read out onto the PCI_AD bus sequentially at twice the data rate at which the data is arriving from the DRAM 16. Note that as the terms ae used herein, "sub-latches" and "half-latches" are nevertheless latches in their own right. Similarly, a "sub-storage-element" or a "half-storage-element" is still a storage element in its own right.

The circuitry for implementing ping-pong buffering for PCI-bus-originated read accesses to DRAM is illustrated in FIG. 8. As mentioned, it includes two 64-bit-wide storage elements 802 and 808. Storage element 802 includes high- and low-order 32-bit half-latches 804 and 806, respectively, and storage element 808 includes high- and low-order 32-bit latches 810 and 812, respectively. MD(63:32) is provided to the data input port of high-latch 804 and high-latch 810, and MD(31:0) is provided to the data input ports of low-latch 806 and low-latch 812. The data output ports of high-latch 804 and high-latch 810 are provided to respective input ports of a 32-bit multiplexer 814, and the data output ports of low-latches 806 and 812 are provided to respective input ports of a multiplexer 816. The output ports of multiplexers 814 and 816 are provided to respective input ports of another multiplexer 818, the output of which drives an MMD(31:0) bus 47. Note that while 2-input multiplexers 814, 816 and 818 are shown in FIG. 8, a single 4-input multiplexer would be equivalent.

The four half-latches and three multiplexers are fabricated on the data bus controller chip 556. MMD(31:0) constitutes an inter-data bus which carries the results to the integrated peripherals controller 558, which synchronizes the results with the PCICLK and drives the data out onto the PCI_AD (31:0) bus. The resynchronization flip-flop is illustrated as 822 in FIG. 8. The PCI-bus agent receiving the data clocks it in in response to the first rising edge of PCICLK during which the ready signal TRDY# (driven by SYSC 557) is asserted. (It is assumed herein that IRDY# is already asserted.)

The enable inputs for the latches 804, 806, 810 and 812 are controlled by a logic circuit 824 in response to DLE0#. Inside logic circuit 824, DLE0# is connected to the clock input of a flip-flop 826, whose QN output is connected back to its D input such that the flip-flop operates as a toggle. DLE0# is also connected to inverting inputs of each of two 2-input AND gates 828 and 830. The second input of AND gate 828 is inverting and is connected to the Q output of flip-flop 826, whereas the second input of AND gate 830, also connected to the Q output of flip-flop 826, is non-inverting. The output of AND gate 828 forms a GATE0 signal which is connected to the enable inputs of latches 804 and 806, and the output of AND gate 830 forms a GATE1 signal which is connected to the enable inputs of latches 810 and 812.

The selections made by multiplexers 814, 816 and 818 are controlled by a logic circuit 832 in response to DLE1#. Inside logic circuit 832, DLE1# is connected to an inverting clock input of a flip-flop 834, the QN output of which is connected back to its D input such that the flip-flop 834 operates as a toggle. The Q output of flip-flop 834 forms an S1 select signal for both of the multiplexers 814 and 816. DLE1# directly forms an S0 signal to control the multiplexer 818.

Figure 9:
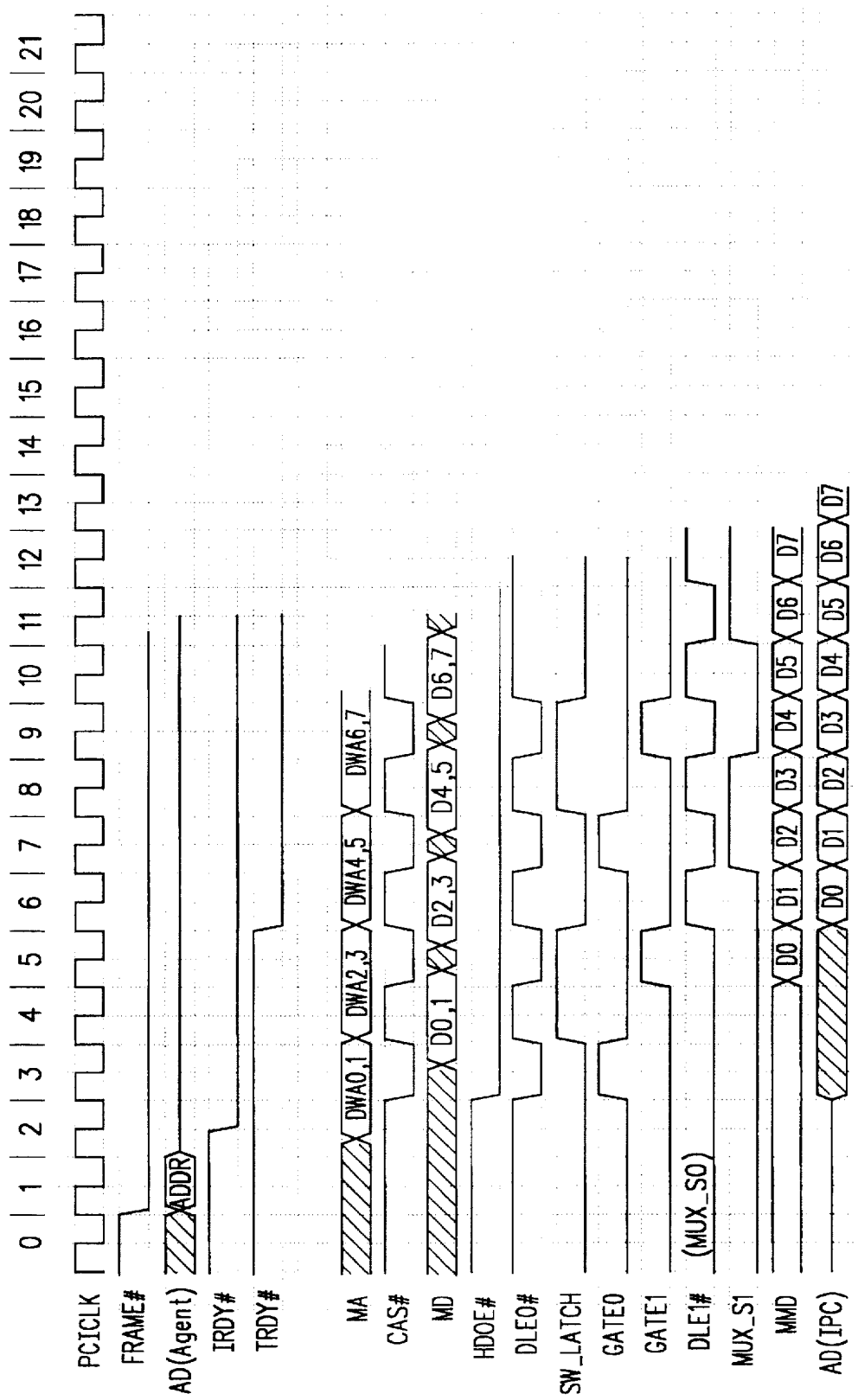
FIG. 9 is a timing diagram illustrating the operation of the apparatus of FIG. 8.

FIG. 9 is a timing diagram illustrating the operation of the apparatus of FIG. 8. The signals DLE0# and DLE1# are generated by the system controller 557 synchronously with the PCICLK signal, as is CAS# provided to the DRAM 16. However, in an aspect of the invention, the apparatus of FIG. 8 does not require PCICLK to be present on the data bus controller chip 556 at all. It can be seen from FIG. 8 that all processing of the signals DLE#(1:0) and the data is performed asynchronously, the result being resynchronized with PCICLK only as it passes through the integrated peripherals controller 558.

The PCICLK typically operates at half the frequency of HCLK, and, unlike the timing diagrams of FIGS. 5, 6 and 7, the timing diagram of FIG. 9 does not attempt to show accurately where edge transitions occur within each PCI-CLK cycle. Nevertheless, if an edge transition is shown to occur within a particular PCICLK cycle in FIG. 9, then it can be assumed that the edge transition will in fact take place sometime during that PCICLK cycle, although perhaps not at the exact position where it appears in FIG. 9.

As with the timing diagram of FIG. 4, the clock cycles in FIG. 9 are numbered along the top of the figure. In PCICLK cycle 1, one of the peripheral agents (24, for example) in FIG. 1 asserts FRAME# onto the PCI-bus 20. Also in PCICLK cycle 1, the agent 24 drives an address onto the PCI_AD bus. PCI-bus transactions are burst transactions with address and data multiplexed on the same PCI_AD bus. In PCICLK cycle 2, therefore, the agent 24 stops driving PCI_AD and, it is assumed, asserts IRDY# to indicate that it is ready to accept data.

The system controller chip 557 clocks in the address from the PCI_AD bus in PCICLK cycle 2, and drives an appropriate quadword address onto memory address bus 42. (Page hit and cache miss conditions are assumed for purposes of FIG. 9.) As used herein, a quadword address is an address in which sufficient bits are specified in order to uniquely identify one quadword (an 8-byte data unit). Thus, the low-order three bits of a byte address are omitted on the memory address bus 42. Also as used herein, a double word (also called dword) is a 4-byte-wide data unit. Thus, a quadword address is sufficient to uniquely identify a pair of dwords. Thus, referring to FIG. 9, it can be seen that in PCICLK cycle 2, the quadword address which the system controller chip 557 drives onto the memory address bus 42 identifies a dword pair "0,1". In PCICLK cycle 4, system controller 557 drives the next quadword address onto the memory address bus 42, which identifies dwords 2,3. In PCICLK cycle 6, the address on memory address bus 42 identifies dwords 4,5 and beginning in PCICLK cycle 8, the address on memory address bus 42 identifies dwords 6,7, and so on.

In PCICLK cycle 3, the system controller 557 asserts CAS#, HDOE# and DLE0#. System controller 557 in fact alternates the polarity of both CAS# and DLE0# in every PCICLK cycle until the burst is complete. In response to each assertion of CAS#, the DRAM 16 drives new valid data onto MD(63:0). In response to the first low-going pulse in DLE0#, logic circuit 824 (FIG. 8) gates the data from MD bus 46 into the latches 804 and 806. Dwords 0 and 1 are valid at the inputs of latches 804 and 806 sufficiently before logic circuit 824 lowers the enable inputs of these latches in order to satisfy the set-up time hold requirements of the latches 804 and 806. Thus, at least as early as PCICLK cycle 4, the first quadword of data from the DRAM 16 has been latched into the latches 804 and 806.

In response to the first rising edge of DLE0#, the flip-flop 826 brings the SW_LATCH signal high in logic circuit 824 such that the second low-going pulse of DLE0# causes the second quadword of data to be loaded into latches 810 and 812 instead of latches 804 and 806. SW_LATCH then switches again, and the third quadword of data is loaded into the latches 804 and 806 at the time of the third low-going pulse of DLE0#. Similarly, the fourth low-going pulse of DLE0# causes the fourth quadword of data from the DRAM 16 to be loaded into latches 810 and 812.

In PCICLK cycle 5, both DLE1# and S1 output from logic circuit 832 are low. The first quadword of data has already been latched into latches 804 and 806, and during PCICLK cycle 5, the second quadword is being loaded into latches 810 and 812. At the same time, the multiplexers 814, 816 and 818 are selecting onto MMD(31:0) the dword currently stored in high latch 804. DLE1# goes high in PCICLK cycle 6, causing the multiplexers to select the data from low latch 806 onto MMD(31:0). The logic circuit 832 brings S1 high for the multiplexers 814 and 816 in PCICLK cycle 7, so that dwords 2 and 3 can be driven onto MMD(31:0) from latches 810 and 812 at the same time dwords 4 and 5 are being loaded into latches 804 and 806. Such ping-pong operation of the latches continues until the burst completes. As mentioned, and as shown in FIG. 9, the data on MMD(31:0) is resynchronized (and therefore delayed until the beginning of the next PCICLK cycle) before it is driven onto the PCI_AD bus by the integrated peripherals controller 558. It can be seen that the apparatus of FIG. 8 achieves X-1-1-1 timing for PCI-bus read accesses to DRAM, despite a data bus width mismatch, and using only a 2-deep ping-pong buffer made only of transparent latches.

It should be noted that whereas the timing diagram of FIG. 9 assumes that DRAM 16 is EDO DRAM (as can be seen by observing that MD remains valid until after the next CAS# falling edge), X-1-1-1 timing is achieved even if the DRAM 16 were fast-page mode DRAM. This can be seen by referring to FIG. 9 and assuming that the data on MD bus 46 goes invalid in response to the rising edges of CAS#. It can be seen that even in this case, the data is still valid at the proper time to be enabled into the latches in accordance with GATE0 and GATE1.

III. PCI-ORIGINATED WRITES TO DRAM

Figure 10:
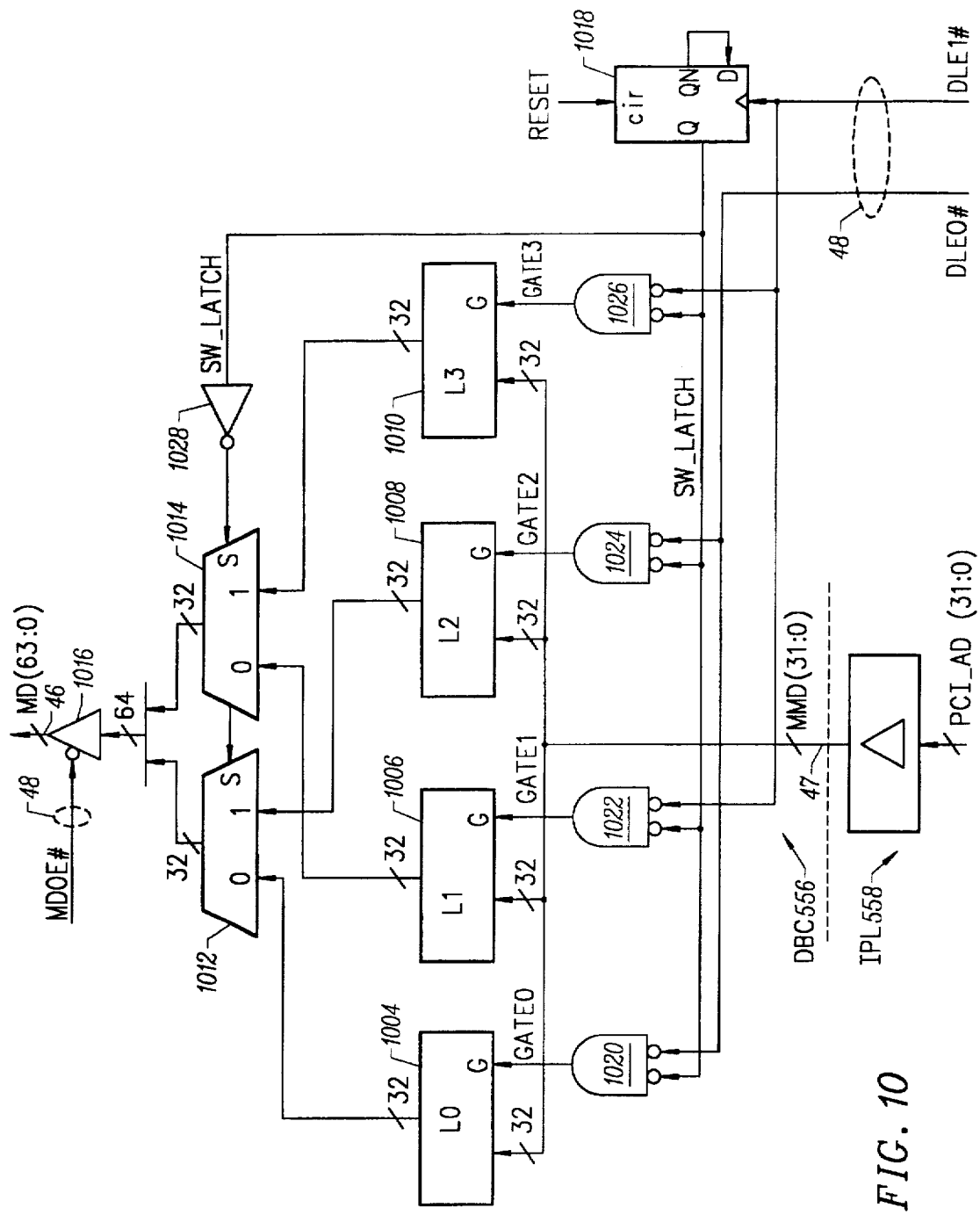
FIG. 10 is a block diagram of a portion of the DBC of FIG. 1 in another embodiment of the invention.

FIG. 10 is a block diagram illustrating the use of the invention in the context of a data write access to DRAM, and more particularly, a data write access originating on the PCI-bus 20.

Referring to FIG. 10, internally to the integrated peripherals controller 558 (FIG. 1), the PCI_AD(31:0) bus is buffered onto MMD(31:0) bus 47. Internal to the data bus controller chip 556, MMD(31:0) is connected to the data input ports of each of four latches 1004, 1006, 1008 and 1010. The data outputs of latches 1004 and 1008 are connected to respective input ports of a multiplexer 1012, and the data outputs of latches 1006 and 1010 are connect to respective input ports of a multiplexer 1014. The 32-bit data outputs of the multiplexers 1012 and 1014 are combined as a 64-bit bus which, after passing through three-state buffer driver 1016; is coupled onto the 64-bit MD bus 46. Note that while multiplexers 1012 and 1014 are shown in FIG. 10 as separate 32-bit multiplexers, it would be equivalent to consider them as a single 64-bit multiplexer.

The DLE1# signal from the system controller 557 is connected to the clock input of a flip-flop 1018, the QN output of which is connected back to the D input to form a toggle flip-flop. The Q output of flip-flop 1018 forms a SW_LATCH signal, which is connected to inverting inputs of each of two AND gates 1020 and 1022. It is also connected to non-inverting inputs of each of two AND gates 1024 and 1026. The second inputs of each of the AND gates 1022 and 1026, both of which are inverting inputs, are also connected to receive DLE1#, and the second inputs of AND gates 1020 and 1024, both of which are inverting inputs, are connected to receive DLE0# from the system controller 557. The outputs of AND gates 1020, 1022, 1024 and 1026 form signals GATE0, GATE1, GATE2 and GATE3, respectively, which are connected to the enable inputs of latches 1004, 1006, 1008 and 1010, respectively.

The select input to each of the multiplexers 1012 and 1014 is connected to the output of an inverter 1028, the input of which is connected to receive SW_LATCH. The inverting enable input of the buffer driver 1016 is connected to receive the MDOE# signal from the system controller chip 557.

Figure 11:
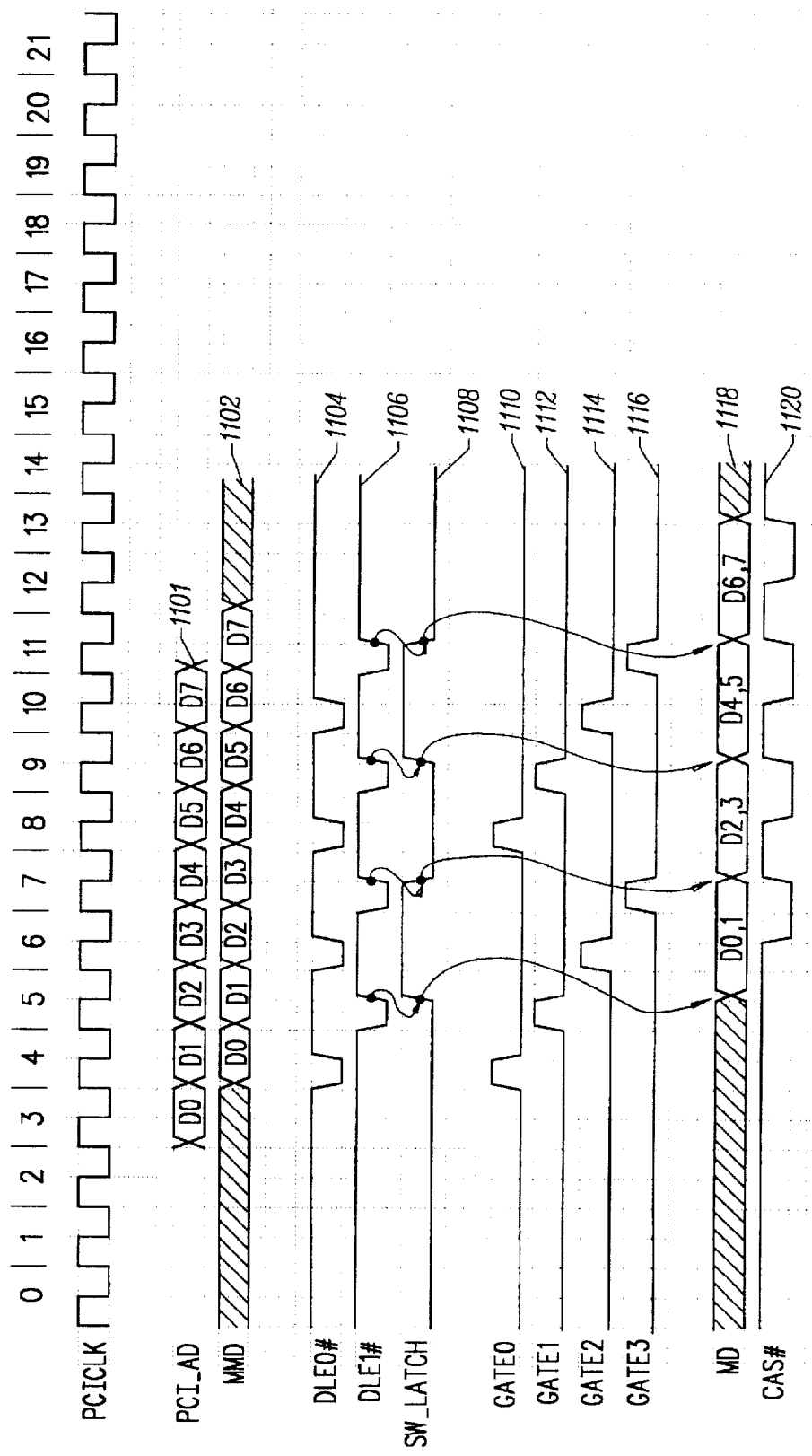
FIG. 11 is a timing diagram illustrating the operation of the circuitry of FIG. 10.

FIG. 11 is a timing diagram illustrating the operation of the circuitry of FIG. 10. Initially, it is assumed that one of the peripheral agents, for example peripheral agent 24, has already become a master on the PCI-bus 20, has already asserted FRAME# and IRDY#, and has already received TRDY# asserted. In PCICLK cycle 3, the agent 24 drives the first dword, denoted D0, onto the PCI_AD bus (see waveform 1101). D0 then appears on MMD bus 47 in PCICLK cycle 3. Since the circuitry of FIG. 10 is able to achieve X-1-1-1 timing for PCI-originated writes to DRAM, MMD bus 47 carries a new dword beginning in each PCICLK cycle thereafter, as indicated in waveform 1102.

The system controller chip 557 asserts DLE0# in PCICLK cycles 4, 6, 8 and 10, and asserts DLE1# in PCICLK cycles 5, 7, 9 and 11 (waveforms 1104, 1106). Each assertion of DLE#(1:0) has a duration of half of a PCICLK cycle. Furthermore, as indicated in waveform 1108, the signal SW_LATCH begins the burst at a low-logic level and reverses polarity in response to each rising edge of DLE1#.

Waveforms 1110, 1112, 1114 and 1116 illustrate the GATE0, GATE1, GATE2 and GATE3 signals, respectively. It can be seen that dword D0 is latched into latch 1004 during PCICLK cycle 4; dword D1 is latched into latch 1006 during PCICLK cycle 5; and so on through latches 1008 and 1010, and continuing in "round robin" fashion through the four latches until all eight dwords of the burst have been loaded. Whereas the circuit of FIG. 8 loads the latches in ping-pong fashion (considering sub-latches 804 and 806 together as a latch and considering sub-latches 810 and 812 together as a latch), and reads the latches out onto MMD bus 47 in round robin fashion, the circuit of FIG. 10 loads the four latches (sub-latches) in round robin fashion and reads them out in ping-pong fashion (considering sub-latches 1004 and 1006 as one latch and sub-latches 1008 and 1010 as the second latch). Thus, in response to the SW_LATCH signal, as indicated in waveform 1118 in FIG. 11, the multiplexers 1012 and 1014 select onto MD bus 46 the data from latches 1004 and 1006 from PCICLK cycle 5 to PCICLK cycle 7; the data from latches 1008 and 1010 from PCICLK cycle 7 to PCICLK cycle 9; and continuing alternately thereafter. It can be seen from the figure that the quadword containing dwords 0 and 1 appear on MD bus 46 while dwords 2 and 3 are being loaded into latches 1008 and 1010; the quadword containing dwords 2 and 3 appear on MD bus 46 at the same time dwords 4 and 5 are being sequentially loaded into latches 1004 and 1006; and so on.

Waveform 1120 illustrates that the system controller 557 asserts CAS# to the DRAM 16 in response to the PCICLK falling edge in PCICLK cycle 6, thereby writing the first quadword into DRAM 16. System controller 557 continues to assert CAS# at the PCICLK falling edge in every second PCICLK cycle thereafter. It can be seen that the circuit of FIG. 10 achieves X-1-1-1 timing for PCI-originated write accesses to DRAM, using only ping-pong buffering, using latches and not master/slave flip-flops, and despite the mismatch in the width of the PCI_AD and MD data buses.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A memory access circuit for transferring data from a memory to a destination device in a burst read access of said memory, comprising:

first and second 1-deep data storage elements, each having a data input port coupled to receive data from said memory and each having a data output port;

a multiplexer having first and second input ports coupled to receive data output from said data output ports of said first and second data storage elements, respectively, said multiplexer further having an output port coupled to said destination device; and control circuitry coupled to said data storage elements to load data during said burst from said memory into alternatingly said first and second data storage elements, coupled to said multiplexer to select to said destination device during said burst data output from alternatingly said first and second data storage elements, and coupled to said destination device to assert a ready signal in correspondence with each of said alternations of said multiplexer.

2. A circuit according to claim 1, wherein said destination device comprises a PCI-bus master, and wherein said ready signal comprises a PCI-bus TRDY# signal.

3. A circuit according to claim 1, wherein said destination device comprises an Intel 80×86-compatible CPU, and wherein said ready signal comprises a BRDY# signal.

4. A circuit according to claim 1, wherein said control circuitry comprises:

a first portion on a first integrated circuit chip, said first portion having an address strobe output (CASB) which said first integrated circuit chip applies to said memory, and a storage control output (DLE0B); and a second portion on a second integrated circuit chip, said second integrated circuit chip further including said data storage elements, said first chip applying said storage control output to said second chip, said second portion asserting storage control signals (GATE0, GATE1) to said first and second storage elements alternatingly in response only, during said burst, to said storage control output of said first portion.

5. A circuit according to claim 4, for use with a clock signal (HCLK).

wherein said first portion further has a multiplexer control output (DLE1B) and said first chip applies said multiplexer control output to said second chip, said first portion further asserting said ready signal synchronously with said clock signal, wherein said second chip includes said multiplexer, wherein said second portion receives said multiplexer control output and in response thereto generates a multiplexer selection signal for said multiplexer synchronously with said clock signal.

6. A circuit according to claim 5, wherein said second portion asserts said storage control signals asynchronously with said clock signal.

7. A circuit according to claim 4, for use with a clock signal (PCICLK).

wherein said first portion further has a multiplexer control output (DLE1B) and said first chip applies said multiplexer control output to said second chip, said first portion further asserting said ready signal synchronously with said clock signal, wherein said second chip includes said multiplexer, wherein said second portion receives said multiplexer control output and in response thereto generates a multiplexer selection signal for said multiplexer asynchronously with said clock signal, and wherein said multiplexer output port is coupled to said destination device via a synchronizer which synchronizes the data output of said multiplexer with said clock signal.

8. A circuit according to claim 1, wherein said first and second data storage elements are latches.

9. A circuit according to claim 1, wherein said memory has a data port providing said data to said first and second data storage elements, said memory data port having a memory data port width, wherein said multiplexer output port has a width which is half the memory data port width, wherein said control circuitry is further coupled to said multiplexer to select from sequentially first and second halves of said first data storage element when said multiplexer is selecting from said first data storage element, and from said sequentially first and second halves of said second data storage element when said multiplexer is selecting from said second data storage element, and wherein said control circuitry is coupled to said destination device to assert a ready signal in correspondence with each of said sequential selections.

10. A method for transferring data from a memory to a destination device, in response to a burst read access of said memory, comprising the steps of:

first loading a data unit of said burst from said memory into a first data storage element;

second after said first loading step, loading a data unit of said burst from said memory into a second data storage element;

loading further data units of said burst from said memory into alternatingly said first data storage element and said second data storage element, one data unit in each alternation, until a last data unit of said burst is loaded into one of said first and second data storage elements;

before each loading of a data unit of said burst into said first data storage element in said step of loading further data units, transferring the data unit in said first data storage element to said destination device; and before each loading of a data unit of said burst into said second data storage element in said step of loading further data units, transferring the data unit in said second data storage element to said destination device.

11. A method according to claim 10, wherein said memory and said destination device have equal data port widths.

12. A method according to claim 10, wherein said memory has a data port width and said destination device has a data port width which is half that of said memory, each data unit of said burst having first and second halves, wherein said first and second data storage elements each comprise first and second data storage sub-elements, wherein said step of transferring a data unit in said first data storage element comprises the step of transferring both halves of the data unit in said first data storage element sequentially, both before each loading of a data unit of said burst into said first data storage element in said step of loading further data units, and wherein said step of transferring the data unit in said second data storage element comprises the step of transferring both halves of the data unit in said second data storage element sequentially, both before each loading of a data unit of said burst into said second data storage element in said step of loading further data units.

13. A method according to claim 12, wherein each of said loading steps load both halves of a data unit simultaneously into a storage element.

14. A method according to claim 10, for use with a clock signal clocking said destination device, wherein each of said loading steps operate asynchronously with said clock signal, and wherein each of said transferring steps operate synchronously with said clock signal.

15. A method according to claim 10, wherein said burst read access includes a penultimate data unit and a last data unit, wherein said step of loading further data units includes a step of loading said penultimate data unit into said first data storage element and said last data unit into said second data storage element, further comprising the steps of:
transferring said penultimate data unit from said first data storage element to said destination device; and
subsequently transferring said last data unit from said second data storage element to said destination device.

16. A memory access circuit for transferring data from a memory to a destination device, for use with a clock signal (HCLK; PCICLK) clocking said destination device, said memory having an address strobe input and a data output port, comprising:

a first integrated circuit chip (557) having an external address strobe connection lead (CAS#) for connecting to said address strobe input of said memory and further having a latch control connection lead (DLE0#);

a control circuit on said first integrated circuit chip, said control circuit having an address strobe output (CASB) and a latch control output (DLE0B), said control circuit asserting address strobe signals on said address strobe output synchronously with said clock signal and generating edge transitions on said latch control output synchronously with said clock signal;

an address strobe signal path on said first integrated circuit chip connecting said address strobe output to said external address strobe connection lead, said address strobe signal path having an insertion delay $T_{CAS}$ for assertions of said address strobe signal;

a latch control signal path also on said first integrated circuit chip connecting said latch control output to said latch control connection lead, said latch control signal path having an insertion delay $T_{DLE0}$ for edge transitions of at least a first polarity on said latch control output, said address strobe signal path and said latch control signal path being such that $T_{CAS}-T_{DLE0}$ remains substantially constant over a predetermined operating range of power supply voltages and integrated circuit chip temperatures;

a first latch having a data input port for receiving data from said data output port of said memory and further having an enable input for receiving a first enable signal (GATE0) responsive to edge transitions on said latch control connection lead, said first latch further having a data output port; and a synchronizer having a first data input coupled to said data output port of said first latch and further having a data output port, said synchronizer synchronizing data from said data output port of said first latch with said clock signal for provision to said destination.

17. A circuit according to claim 16, wherein said latch control connection lead is an external connection lead of said first integrated circuit chip, and wherein said first latch is fabricated on a second integrated circuit chip different from said first integrated circuit chip.

18. A circuit according to claim 16, wherein said first latch is one of a plurality of latches each having a data input port for receiving data from said data output port of said memory and further having an enable input for receiving a respective enable signal (GATE1), said enable signals causing said latches to latch data from said memory in round-robin fashion, each of said latches further having a data output, and wherein said synchronizer has a respective data input coupled to the data output ports of each of said latches, said synchronizer selecting the data outputs of said latches in round-robin fashion to the data output port of said synchronizer.

19. A circuit according to claim 18, wherein all of said latches are fabricated on a second integrated circuit chip different from said first integrated circuit chip, further comprising gate control circuitry on said second integrated circuit chip having an input for receiving said edge transitions from said latch control connection lead and further having a respective output coupled to the enable inputs of each of said latches, said gate control circuitry enabling all of said latches in round-robin fashion in response to said edge transitions from said latch control connection lead.

20. A circuit according to claim 18, wherein said control circuit on said first integrated circuit chip further has a multiplexer control output (DLE1B) and a multiplexer control connection lead (DLE1#) coupled to said multiplexer control output via a multiplexer control signal path on said first integrated circuit chip, said control circuitry generating edge transitions on said multiplexer control output, and wherein said synchronizer selects the data output of each next one of said latches in response to signal levels on said multiplexer control connection lead sampled synchronously with said clock signal.

* * * * *